United States Patent Office 3,093,648
Patented June 11, 1963

3,093,648
18β-DESOXY-18-OXO- AND 18-OXIMINO-
RESERPATES
Michael Mullen Robison, Berkeley Heights, Harold Belding MacPhillamy, Madison, and Robert Armistead Lucas, Mendham, N.J., assignors to Ciba Corporation, a corporation of Delaware
No Drawing. Filed July 31, 1961, Ser. No. 127,853
12 Claims. (Cl. 260—287)

The present invention concerns 3-epi-allo-yohimban-18-one compounds having the nucleus of the formula:

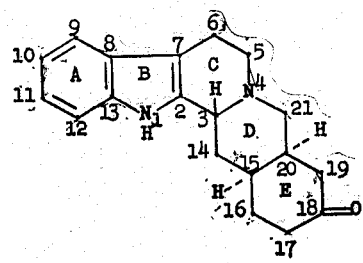

More particularly, it relates to 3-epi-allo-yohimban-18-one 16β-carboxylic acid esters, particularly 17α-R-3-epi-allo-yohimban-18-one 16β-carboxylic acid esters, in which R represents primarily lower alkoxy, as well as cyano, the functional ketone derivatives of such compounds, as well as the salts, N-oxides or salts of N-oxides thereof. Apart from the groups in the 16β-position and the 17α-position, and the oxo-group in the 18-position, the compounds of the present invention may contain additional substituents. Thus, substituents attached to the positions of the aromatic nucleus, i.e. ring A, of the molecule, more specifically to the 9-position, the 10-position, the 11-position and/or the 12-position, are represented, for example, by aliphatic hydrocarbon, such as lower alkyl and the like, etherified hydroxyl, particularly lower alkoxy, as well as cycloalkyloxy, cycloalkyl-lower alkoxy, carbocyclic aryloxy, carbocyclic aryl-lower alkoxy, lower alkylenedioxy and the like, esterified hydroxyl, particularly halogeno, as well as lower alkoxy-carbonyloxy, lower alkanoyloxy and the like, etherified mercapto, such as lower alkylmercapto and the like, nitro, amino, such as N,N-disubstituted amino and the like, halogeno-lower alkyl, particularly trifluoromethyl, or any other suitable substituent. Other substituents, particularly aliphatic hydrocarbon radicals, such as lower alkyl, may also be attached to positions available for substitution in other nuclei, particularly of the heterocyclic nucleus C, more specifically to the 5-position and/or the 6-position.

More especially, the invention is directed to compounds of the formula:

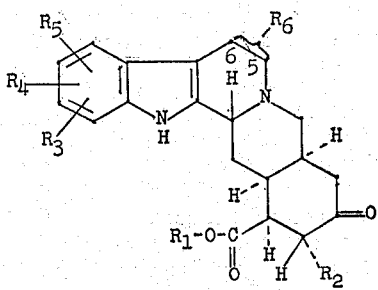

in which $R_1$ represents an aliphatic radical, primarily lower alkyl, as well as a substituted aliphatic radical, primarily substituted lower alkyl, such as, for example, monocyclic carbocyclic aryl-lower alkyl, e.g. phenyl-lower alkyl and the like, etherified hydroxy-lower alkyl, e.g. lower alkoxy-lower alkyl and the like, tertiary amino-lower alkyl, e.g. N,N-di-lower alkyl-amino-lower alkyl and the like, $R_2$ stands primarily for lower alkoxy, as well as for cyano, each of the radicals $R_3$, $R_4$ and $R_5$ stands for hydrogen, lower aliphatic hydrocarbon, particularly lower alkyl, substituted aliphatic hydrocarbon, particularly substituted lower alkyl, such as halogeno-lower alkyl, especially trifluoromethyl, etherified hydroxyl, particularly lower alkoxy, as well as cycloalkyloxy, cycloalkyl-lower alkoxy, carbocyclic aryloxy, carbocyclic aryl-lower alkoxy or any other analogous etherified hydroxyl group, esterified hydroxyl, particularly halogeno, as well as lower alkoxy-carbonyloxy, lower alkanoyloxy and the like, etherified mercapto, particularly lower alkyl-mercapto, nitro, amino, e.g. N,N-di-substituted amino and the like, or, whenever two of the groups $R_3$, $R_4$ and $R_5$ are attached to two adjacent positions and are taken together, for lower alkylenedioxy, and $R_6$, attached to one of the positions 5 and 6, stands for hydrogen or lower alkyl, or the functional ketone derivatives of such compounds, or the salts, N-oxides or salts of N-oxides thereof, as well as process for the preparation of such compounds.

The aliphatic radical of the alcohol portion of the ester grouping attached to the 16β-position of the molecule, which, in the above formula, is represented by the group $R_1$, stands above all for lower alkyl having from one to ten, preferably from one to four, carbon atoms; such groups are particularly methyl, ethyl, n-propyl, isopropyl, n-butyl, isobutyl, secondary butyl and the like, as well as n-pentyl, isopentyl, n-hexyl, n-heptyl and the like.

The esterifying portion of the ester grouping attached to the 16β-position of the molecule, represented by the radical $R_1$ in the above formula, may also stand for a substituted aliphatic radical, particularly substituted lower alkyl, such as, for example, monocyclic carbocyclic aryl-lower alkyl, in which lower alkyl has from one to four carbon atoms, such as phenyl-lower alkyl, e.g. benzyl, 1-phenyl-ethyl, 2-phenylethyl and the like, or phenyl-lower alkyl, in which phenyl is substituted by lower alkyl, e.g. methyl, ethyl and the like, lower alkoxy, e.g. methoxy, ethoxy and the like, halogeno, e.g. fluoro, chloro, bromo and the like, or any other suitable substituent.

Other substituted aliphatic, particularly lower alkyl radicals, as represented by the group $R_1$ in the above formula, are aliphatic, particularly lower alkyl, radicals substituted by functional groups, such as etherified hydroxyl, particularly lower alkoxy having preferably from one to four carbon atoms, e.g. methoxy, ethoxy, n-propyloxy, isopropyloxy, n-butyloxy and the like, tertiary amino, such as N,N-di-lower alkyl-amino, in which lower alkyl has from one to four carbon atoms, e.g. N,N-dimethylamino, N-ethyl-N-methylamino, N,N-diethylamino, N,N-di-n-propylamino, N,N-di-isopropylamino and the like, as well as 1-N,N-alkylene-imino, in which alkylene has from four to six ring carbon atoms, e.g. 1-pyrrolidino, 1-piperidino, 1-N,N-hexamethyleneimino and the like, 1-N,N-oxaalkylene-imino, in which oxa-alkylene has preferably four ring carbon atoms, e.g. 4-morpholino and the like, 1-N,N-thia-alkylene-imino, in which alkylene has preferably four ring carbon atoms, e.g. 4-thiomorpholino and the like, or 1-N,N-lower aza-alkylene-imino, in which aza-alkylene has from four to six ring carbon atoms, particularly 4-lower alkyl-1-piperazino, e.g. 4-methyl-1-piperazino, 4-ethyl-1-piperazino and the like. The aliphatic, particularly lower alkyl, portion in an aliphatic, especially lower alkyl, radical substituted by functional groups, as represented, for example, by etherified hydroxy-lower alkyl, tertiary amino-lower alkyl and the like, is represented by a lower alkylene radical, which has from two to four carbon atoms separating the functional group, such as etherified hydroxyl, tertiary amino and the like, from the 16β-carboxyl group by at least two carbon atoms. Preferably, such lower alkylene radical has from two to three carbon atoms separating the substituent from the 16β-carboxyl group by the same number of carbon atoms. Such alkylene radicals are primarily 1,2-ethylene, 1-methyl-1,2-ethylene, 2-methyl-1,2-ethylene, 1,3-propylene and the like, as well as 1,4-butylene and the like. Aliphatic, particularly lower alkyl, radicals containing a functional group, as represented by $R_1$ in the above formulae, may be, for example, 2-lower alkoxy-ethyl, e.g. 2-methoxyethyl, 2-ethoxyethyl and the like, 2-lower alkoxy-propyl, e.g. 2-methoxy-propyl and the like, 3-lower alkoxy-propyl, e.g. 3-methoxypropyl, 3-ethoxypropyl and the like, 2-N,N-di-lower alkyl-ethyl, e.g. 2-N,N-dimethylaminoethyl, 2-N,N-diethylamino-ethyl and the like, 2-N,N-di-lower alkyl-amino-propyl, e.g. 2-N,N-dimethylaminopropyl and the like, 3-N,N-di-lower alkyl-amino-propyl, e.g., 3-N,N-dimethylaminopropyl, 3-N,N-diethylaminopropyl and the like, 2-(1-N,N-alkylene-imino)-ethyl, e.g. 2-(1-pyrrolidino)-ethyl, 2-(1-piperidino)ethyl and the like, 3-(1-N,N-alkylene-imino)-propyl, e.g. 3-(1-piperidino)-propyl and the like.

The substituent attached to the 17α-position, as represented by the group $R_2$ in the above formula, stands for lower alkoxy which has preferably from one to four carbon atoms, such as ethoxy, n-propyloxy, isopropyloxy, n-butyloxy, isobutyloxy and the like, but above all methoxy. It may also represent cyano.

Substituents attached to any of the positions available for substitution in ring A, particularly those represented by the groups $R_3$, $R_4$ and $R_5$ (each of which may also stand for hydrogen) in the previously given formula, may be, for example, lower aliphatic hydrocarbon, especially lower alkyl, having preferably from one to four carbon atoms, e.g. methyl, ethyl, n-propyl, isopropyl, n-butyl and the like, or functional groups, such as, for example, etherified hydroxyl, particularly lower alkoxy, having preferably from one to four carbon atoms, e.g. methoxy, ethoxy, n-propyloxy, isopropyloxy, n-butyloxy, isobutyloxy and the like, as well as cycloalkyloxy, in which cycloalkyl has from three to eight, preferably from five to six, ring carbon atoms, e.g. cyclopentyloxy, cyclohexyloxy and the like, cycloalkyl-lower alkoxy, in which cycloalkyl has from three to eight, preferably from five to six, ring carbon atoms, e.g. cyclopentylmethoxy, 2-cyclopentylethoxy, cyclohexylmethoxy and the like, carbocyclic aryloxy, such as monocyclic carbocyclic aryloxy, e.g. phenyloxy and the like, carbocyclic aryl-lower alkoxy, such as monocyclic carbocyclic aryl-lower alkoxy, for example, phenyl-lower alkoxy, e.g. benzyloxy, diphenylmethoxy, 2-phenylethoxy and the like, esterified hydroxyl, particularly halogeno (representing hydroxyl esterified by a hydrohalic acid), particularly halogeno having an atomic weight of 19 to 80, e.g. fluoro, chloro or bromo, and the like, as well as lower alkoxy-carbonyloxy, e.g. methoxycarbonyloxy, ethoxycarbonyloxy and the like, or lower alkanoyloxy, e.g. acetoxy- propionyloxy and the like, etherified mercapto, particularly lower alkyl-mercapto, having preferably from one to four carbon atoms, e.g. methylmercapto, ethylmercapto and the like, nitro, amino, particularly N,N-di-substituted amino, such as N,N-di-lower alkyl-amino, e.g. N,N-dimethylamino, N-ethyl-N-methyl-amino, N,N-diethylamino and the like, halogeno-lower alkyl, particularly trifluoromethyl and the like, or any other suitable functional group. A substituent may also be attached to two adjacent positions of ring A and form a fused-on ring; for example, two of the radicals $R_3$, $R_4$ and $R_5$ in the formula, when substituting two neighboring positions and taken together, may also form a fused-on cyclic substituent. Such substituents may be represented, for example, by lower alkylene-dioxy, e.g. methylenedioxy, 1,1-ethylenedioxy and the like, or any other analogous grouping.

Substituents, which may be attached to other positions in the molecule, particularly to positions available for substitution in ring C, are primarily aliphatic hydrocarbon, such as lower alkyl, having preferably from one to four carbon atoms, particularly methyl, as well as ethyl, n-propyl, isopropyl and the like. The radical $R_6$ in the previously given formula, which stands primarily for hydrogen, may, therefore, also represent lower alkyl, particularly methyl, as well as ethyl and the like.

Also included within the scope of the present invention are the functional ketonic derivatives of the 3-epi-allo-yohimban-18-one 16β-carboxylic acid esters. Such derivatives are, for example, the ketals with lower alkylene glycols, e.g. ethylene glycols, 1,2-propylene glycol and the like, mercapto-lower alkanols, e.g. 2-mercapto-ethanol and the like, or with lower alkane di-thiols, e.g. 1,2-ethane di-thiol and the like. Other derivatives are nitrogenous ketonic derivatives, such as oximes, carbazones, thiocarbazones and the like, as well as hydrazones, such as the 2,4-dinitro-phenyl-hydrazones and the like.

Salts of the compounds of this invention, including those of the functional ketonic derivatives thereof, are acid addition salts, primarily the pharmacologically and therapeutically acceptable, non-toxic acid addition salts with inorganic acids, e.g. hydrochloric, hydrobromic, sulfuric, phosphoric acids and the like, or with organic acids, such as organic carboxylic acids, e.g. acetic, tartaric, citric, succinic, maleic acid and the like, or with organic sulfonic acids, e.g. methane sulfonic, ethane sulfonic, 2-hydroxy-ethane sulfonic, ethane 1,2-disulfonic acid and the like.

Also included within the scope of the present invention are the N-oxides of the above-mentioned compounds, as well as the acid addition salts, particularly the pharmacologically and therapeutically non-toxic acid addition salts of these N-oxides, such as the addition salts with the above-mentioned inorganic and organic acids.

In view of the fact that several asymmetric carbon atoms are present in the compounds of this invention, the latter may be obtained in the form of a mixture of racemates, racemates or optically pure compounds.

The compounds of the present invention have sedative and tranquilizing effects on the central nervous system, as well as antihypertensive properties. However, compared with the antihypertensive and sedative effects exerted by the naturally occurring Rauwolfia alkaloids, such as, for example, reserpine, deserpidine, rescinnamine and the like, the compounds of this invention appear to have more predominant sedative effects with negligible antihypertensive activities.

Furthermore, it has also been found that the compounds of this invention act quickly, and the activity is of definite duration, thus making the recovery after treatment more complete and easily controllable. It has also been found that the acid addition salts of these compounds are water-soluble substances, and are, therefore, extremely useful in the preparation of pharmaceutical compositions, particularly of aqueous solutions for injection and aqueous oral preparations, e.g. elixirs and the like.

The compounds of the present invention are, therefore, primarily used as sedative and tranquilizing agents to relieve states of hyperactivity, tension and agitation, as, for example, associated with mental disturbances, anxiety and the like. They may also be used as antihypertensive agents to counteract hypertensive conditions, such as renal hypertension and the like. Furthermore, the compounds of this invention are useful in calming laboratory test animals, such as monkeys, dogs, cats and the like, as well as in the veterinary field to quiet animals, particularly chickens, turkeys and the like, as well as other domestic animals to facilitate handling during vaccination, shipment and the like.

The compounds of this invention may be used in the form of pharmaceutical preparations, which contain the new compounds in admixture with a pharmaceutical organic or inorganic, solid or liquid carrier suitable for enteral or parenteral administration. For making up the preparations there can be employed substances which do not react with the new compounds, such as water, gelatine, lactose, starches, stearic acid, magnesium stearate, stearyl alcohol, talc, vegetable oils, benzyl alcohols, gums, propylene glycol, polyalkylene glycols or any other known carrier used in the manufacture of pharmaceutical preparations. The latter may be in solid form, for example, as capsules, tablets, dragees, and the like, or in liquid form, for example, as solutions, suspensions and the like emulsions. If desired, they may contain auxiliary substances such as preserving, stabilizing, wetting, emulsifying agents and the like, as well as salts for varying the osmotic pressure, buffers, etc. They may also contain, in combination, other useful substances.

The compounds of the present invention may also serve as intermediates for the preparation of other useful compounds. For example, upon treatment with a reducing reagent, a 3-epi-allo-yohimban-18-one 16β-carboxylic acid ester may be converted into corresponding 18-hydroxy-3-epi-allo-yohimbane 16β-carboxylic acid esters. Thus, reduction with sodium borohydride affords the formation of a mixture of an 18β-hydroxy-3-epi-allo-yohimbane 16β-carboxylic acid ester and an 18α-hydroxy-3-epi-allo-yohimbane 16β-carboxylic acid ester, which may be separated into the two single compounds.

The two resulting monoesters may serve as intermediates. For example, an 18α-hydroxy-3-epi-allo-yohimbane 16β-carboxylic acid ester may be converted into an 18α-sulfonyloxy-3-epi-allo-yohimbane 16β-carboxylic acid ester, such as an 18α-(4-bromophenyl-sulfonyloxy)-3-epi-allo-yohimbane 16β-carboxylic acid ester, and the like. The latter may then be subjected to alcoholysis, for example, to treatment with a lower alkanol, if desired, in the presence of a tertiary organic amine, e.g. N,N,N-triethylamine, pyridine and the like, and converted into an 18β-etherified hydroxy-3-epi-allo-yohimbane 16β-carboxylic acid ester, which compounds have pronounced sedative and tranquilizing properties and can be used as sedative and tranquilizing agents. The other type of monoesters, i.e. the 18β-hydroxy-3-epi-allo-yohimbane 16β-carboxylic acid esters are known compounds and are used as intermediates, for example, in the preparation of 18β-esterified hydroxy-3-epi-allo-yohimbane 16β-carboxylic acid esters.

The 3-epi-allo-yohimban-18-one 16β-carboxylic acid esters of this invention may, therefore, be used as important intermediates in the transformation of one configuration of the 18-substituent into the other. For example, by starting with one of the known 18β-hydroxy-3-epi-allo-yohimbane 16β-carboxylic acid esters, esterifying the latter by treatment with a reactive derivative of a strong organic sulfonic acid, e.g. 4-bromo-benzene sulfonyl chloride and the like, oxidizing the resulting ester as will be shown hereinbelow to the 3-epi-allo-yohimban-18-one 16β-carboxylic acid ester, reducing the latter to form the mixture of an 18α-hydroxy-3-epi-allo-yohimbane 16β-carboxylic acid ester and an 18β-hydroxy-3-epi-allo-yohimbane 16β-carboxylic acid ester, which mixture can be separated into the single components and isolating the 18α-hydroxy-3-epi-allo-yohimbane 16β-carboxylic acid ester, an epimerization at the 18-position has been achieved and the resulting compound can be used for further useful purposes.

Apart from having shown sedative and tranquilizing properties, the functional ketonic derivatives are also useful as intermediates, for example, in any purification procedure involving the free 3-epi-allo-yohimban-18-one 16β-carboxylic acid esters, into which they can be converted according to known methods.

A preferred group of compounds having the above-given properties is represented by the compounds having the formula:

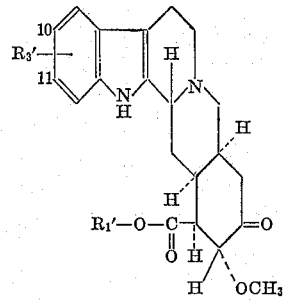

and the corresponding oximes of such compounds having the formula:

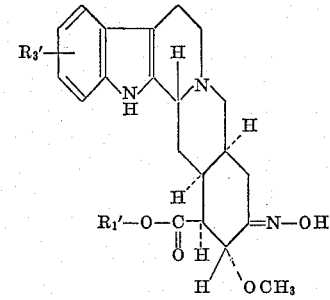

in which formulae $R_1'$ represents lower alkyl, having preferably from one to four carbon atoms, e.g. methyl, ethyl, n-propyl, isopropyl, n-butyl, isobutyl, secondary butyl and the like, and $R_3'$ represents lower alkoxy having from one to four carbon atoms, particularly methoxy, as well as ethoxy, n-propyloxy, isopropyloxy, n-butyloxy and the like, whereby $R_3'$ is preferably attached to the 10-position or the 11-position, and the pharmacologically and therapeutically acceptable, non-toxic acid addition salts of such compounds.

The compounds of the present invention may be prepared, for example, by treating an 18-reactive esterified hydroxy-3-epi-allo-yohimbane 16β-carboxylic acid ester, particularly a compound having one of the formulae:

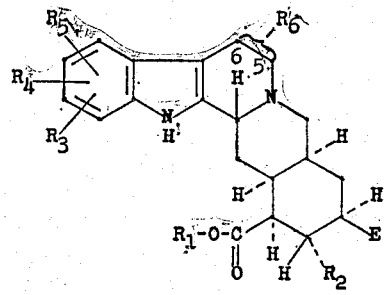

and

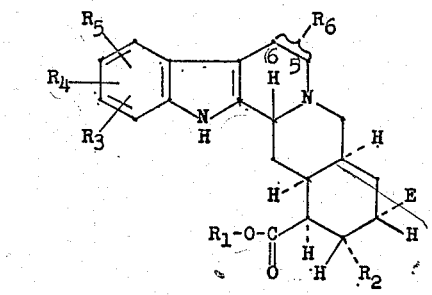

in which $R_1$, $R_2$, $R_3$, $R_4$, $R_5$ and $R_6$ have the previously given meaning, and E represents a reactive esterified hydroxyl group, or a salt, an N-oxide or a salt of an N-oxide thereof, with a sulfoxide oxidation reagent, and, if desired, converting a resulting salt into a free compound, and/or, if desired, converting a resulting compound into a functional ketonic derivative or a salt, an N-oxide or a salt of an N-oxide of such compounds, and/or, if desired, converting in a resulting compound the 16β-carboxylic acid ester group into another carboxylic acid ester group, and/or, if desired, separating a mixture of isomers into the single isomers.

The reactive esterified hydroxyl group in the 18-position of the starting material is represented by a hydroxyl group esterified by a strong inorganic acid, particularly a hydrohalic acid, e.g. hydrochloric, hydrobromic, hydriodic acid and the like. More especially a reactive esterified hydroxyl group is esterified with a strong organic sulfonic acid, such as a lower alkane sulfonic acid, e.g. methane sulfonic, ethane sulfonic acid and the like, a hydroxy-lower alkane sulfonic acid, e.g. 2-hydroxy-ethane sulfonic acid and the like, or, more particularly, with a carbocyclic aryl sulfonic acid, such as a monocyclic carbocyclic aryl sulfonic acid, for example, benzene sulfonic acid, halogeno-benzene sulfonic acid, e.g. 4-bromo-benzene sulfonic acid and the like, nitro-benzene sulfonic acid, e.g. 3-nitro-benzene sulfonic, 4-nitro-benzene sulfonic acid and the like, lower alkyl-benzene sulfonic acid, e.g. p-toluene sulfonic acid and the like, or any other suitable strong inorganic or organic, particularly organic sulfonic acid. The reactive esterified hydroxyl group, for example, the group E in the above formulae, may, therefore, be represented by halogeno, (i.e. a hydroxyl group esterified by a hydrohalic acid) e.g. chloro, bromo, iodo and the like, lower alkyl-sulfonyloxy, e.g. methyl-sulfonyloxy, ethyl-sulfonyloxy and the like, hydroxy-lower alkyl-sulfonyloxy, e.g. 2-hydroxy-ethyl-sulfonyloxy and the like, or, more especially, phenyl-sulfonyloxy, (halogeno-phenyl)-sulfonyloxy, e.g. 4-bromo-phenyl-sulfonyloxy and the like, (nitro-phenyl)-sulfonyloxy, e.g. 3-nitro-phenyl-sulfonyloxy, 4-nitro-phenyl-sulfonyloxy and the like, (lower alkyl-phenyl)-sulfonyloxy, e.g. p-tolyl-sulfonyloxy and the like, or any other suitable reactive esterified hydroxyl group.

The oxidation procedure is carried out by treating the starting material with the sulfoxide oxidation reagent, especially with a di-lower alkyl sulfoxide. Dimethyl sulfoxide is the reagent of choice; diethyl sulfoxide and the like may also be used as a reagent. These reagents are preferably used in the presence of a mild base, such as, for example, an organic base, such as an N,N,N-tri-lower alkyl-amine, e.g. N,N,N-triethylamine, and the like, or any other suitable organic base, as well as an inorganic base, such as an alkali metal carbonate, e.g. sodium bicarbonate, potassium bicarbonate, lithium carbonate, sodium carbonate, potassium carbonate and the like, or any other suitable inorganic base. The reaction may be performed in the absence of a solvent; an inert solvent, such as, for example, acetonitrile, benzene and the like, may be added to ensure complete solution. The conversion of the starting material into the 3-epi-allo-yohimban-18-one compound proceeds preferably at an elevated temperature, if necessary, in a closed vessel, and/or in the atmosphere of an inert gas, e.g. nitrogen and the like.

The starting materials used in the above reaction are known or may be prepared according to known procedures. Esters with strong sulfonic acids may be prepared, for example, by esterifying the free 18-hydroxyl group in an 18-hydroxy-3-epi-allo-yohimbane 16β-carboxylic acid ester, for example, by treatment with a reactive derivative of a strong organic sulfonic acid, such as a halide, particularly a chloride of such acid, in the presence of a base, especially pyridine and the like. The starting materials, in which the 18-esterified hyroxyl group has the α-configuration may be obtained, for example, by hydrolyzing an 18β-sulfonyloxy-3-epi-allo-yohimbane 16β-carboxylic acid ester (manufactured from an 18β-hydroxy-3-epi-allo-yohimbane 16β-carboxylic acid ester) with water, if desired, in the presence of a tertiary organic amine, e.g. N,N,N-triethylamine and the like, and esterifying a resulting 18α-hydroxy-3-epi-allo-yohimbane 16β-carboxylic acid ester as shown hereinabove. The reactive ester of the 18-hydroxyl group with a hydrohalic acid may be formed, for example, by treating an 18-sulfonyloxy-3-epi-allo-yohimbane 16β-carboxylic acid ester with an alkali metal halide, particularly a lithium halide, e.g. lithium bromide and the like, in the presence of an inert solvent, such as, for example, acetonitrile and the like.

A further method for the preparation of the compounds of this invention comprises isomerizing an allo-yohimban-18-one 16β-carboxylic acid ester, particularly a compound of the formula:

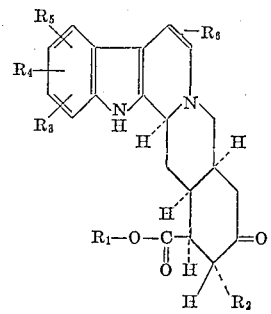

in which $R_1$, $R_2$, $R_3$, $R_4$, $R_5$ and $R_6$ have the above-given meaning, or a functional ketonic derivative of such compound, or a salt, an N-oxide or a salt of an N-oxide thereof, by treatment with an acid and isolating the desired 3-epi-allo-yohimban-18-one 16β-carboxylic acid ester, particularly a desired compound of the formula:

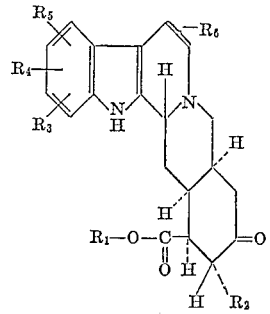

in which $R_1$, $R_2$, $R_3$, $R_4$, $R_5$ and $R_6$ have the previously given meaning, or a functional ketonic derivative of such compound, or a salt, an N-oxide or a salt of an N-oxide thereof, and, if desired, carrying out the optional steps.

Acids used in the above isomerization procedure are, for example, organic carboxylic acids, particularly aliphatic hydrocarbon carboxylic acids, such as lower alkanoic acids, e.g. acetic, propionic acid and the like, primarily glacial acetic acid, organic sulfonic acids, particularly monocyclic carbocyclic aryl sulfonic acids, e.g. p-toluene sulfonic acid and the like, as well as lower alkane sulfonic acids, e.g. methane sulfonic acid and the like, or strong mineral acids, such as hydrohalic acids, e.g. hydrochloric acid and the like, or mixtures of acids. The reaction may be carried out in the presence or absence of an additional solvent; for example, p-toluene sulfonic acid may also be used in the presence of an organic base, e.g. collidine and the like, whereas hydrogen chloride may be used in an anhydrous lower alkanol, e.g. methanol, ethanol and the like. Isomerization may occur at room temperature or preferably at an elevated temperature, in an open vessel or under pressure, preferably in an atmosphere of nitrogen.

Optimum yields in the isomerization reaction may be obtained by removing the desired product from the reaction milieu, thus displacing the reaction equilibrium in favor of the product. The removal may be accomplished by separating the product, if desired, in the form of a salt thereof, from the starting material by exploiting the different relative solubilities in different solvent systems. For example, the product or a salt thereof may be separated from the starting material or a salt thereof either by adsorption on a suitable material, such as alumina, paper and the like, and subsequent fractional elution, or by fractional crystallization from a solvent or a mixture of solvents. The starting material separated from the desired product may then be recycled into the isomerization process, to enhance the overall yield of the procedure.

The starting materials used in the isomerization procedure may be produced, for example, by treatment of an 18-reactive esterified hydroxy-allo-yohimbane 16β-carboxylic acid ester, a salt, an N-oxide or a salt of an N-oxide thereof, with a sulfoxide oxidation reagent; this reaction is carried out according to the method described hereinbefore.

The compounds resulting from the above-outlined procedures may be obtained in the form of an acid addition salt thereof. Such salt may be converted into the free base, for example, by reacting the former with an alkaline reagent, such as, for example, aqueous ammonia, silver oxide and the like, or an ion exchange resin, or any other suitable alkaline reagent.

Resulting compounds may be converted into a functional ketonic derivative thereof. For example, nitrogenous ketone derivatives, particularly the oximes, as well as the hydrazones, semicarbazones, thiosemicarbazones and the like, may be prepared by treating the resulting ketone compound with the reagent or a salt thereof, especially with hydroxylamine or a salt, such as the hydrochloride, sulfate and the like, thereof, as well as with a hydrazine, a semicarbazide, a thiosemicarbazide and the like, or a salt thereof. The reaction is preferably carried out while heating in the presence of an inert solvent and of an acid neutralizing reagent, e.g. sodium carbonate and the like, particularly whenever an acid addition salt of a reagent is used, and/or a buffer, e.g. sodium acetate and the like, and/or in the atmosphere of an inert gas, e.g. nitrogen. Other ketone derivatives, such as the ketals, are prepared by reacting the resulting ketone compound with the reagent, such as ethylene glycol and the like, in the presence of a catalytic amount of a suitable acid, e.g. toluene sulfonic acid and the like.

The compounds of this invention, their ketone derivatives and N-oxides thereof may be converted into the salts thereof, for example, by treating a solution of the free base in a suitable solvent, with the acid or a solution thereof and isolating the resulting salt. Resulting salts may be converted into other salts, for example, by reacting the former with a metal, such as an alkali metal, e.g. sodium, potassium and the like, salt or any equivalent salt of an inorganic or organic acid and isolating the desired converted salt. The salts may also be obtained as the hemihydrates, monohydrates, sesquihydrates or polyhydrates depending on the conditions used in the formation of the salts.

N-oxides of the compounds of the present invention may be formed according to known methods; for example, a resulting compound, preferably a solution thereof in an inert solvent, may be reacted with an N-oxidizing reagent, such as, for example, hydrogen peroxide, ozone, persulfuric acid, or more especially, an organic peracid, such as an organic percarboxylic acid, e.g. persulfonic acid, e.g. p-toluene persulfonic acid and the like. In the N-oxidation reaction an excess of the oxidation reagent and/or an increase in temperature should be avoided in order to prevent oxidative degradation.

In a resulting compound, a 16β-esterified carboxyl group may be converted into another 16β-esterified carboxyl group. This may be achieved according to known methods, for example, by transesterification.

The transesterification reaction may be carried out, for example, by treating the starting material with an alcohol, primarily with a lower alkanol, e.g. methanol, ethanol, propanol, n-butanol, isobutanol and the like, or a substituted lower alkanol. The reaction may be carried out in the presence of a Lewis base, such as, for example, an alkoxide ion, as, for example, furnished by an alkali metal alcoholate, especially an alkali metal lower alkanolate, e.g. lithium, sodium or potassium methanolate, ethanolate, n-propanolate, n-butanolate, isobutanolate and the like, an alkaline earth metal lower alkanolate, e.g. barium or strontium methanolate, ethanolate, n-propanolate, n-butanolate, isobutanolate and the like, or an aluminum lower alkanolate, e.g. aluminum methanolate, ethanolate, n-propanolate, isopropanolate, n-butanolate, isobutanolate and the like. The individual alcoholate compounds are employed together with the corresponding alcohol used as the transesterification reagent. Other alcohols, such as substituted lower alkanols, may be used in the presence of the corresponding alkali metal, alkaline earth metal or aluminum alcoholates. Other Lewis base-type catalysts are, for example, an alkali metal cyanide, e.g. potassium cyanide and the like, a strong quaternary ammonium hydroxide, e.g. benzyl-tri-methyl-ammonium hydroxide and the like, or any other suitable transesterification catalyst. The transesterification reaction may also be catalyzed by an acidic reagent; an inorganic acid, such as tungstic acid and the like, or an organic acid, such as p-toluene sulfonic acids and the like, may be employed.

Apart from the esterifying alcohol, which may simultaneously serve as a diluent, other inert solvents may be used in the above-mentioned transesterification reaction; carbocyclic aryl hydrocarbons, e.g. benzene, toluene and the like, are examples of such inert solvents. If necessary, the reaction may be carried out at an elevated temperature, under increased pressure and/or in the atmosphere of an inert gas, e.g. nitrogen.

Conversion of a 16β-esterified carboxyl group into another 16β-esterified carboxyl group may also be achieved by hydrolysis and subsequently re-esterification of the free 16β-carboxyl group in a resulting 3-epi-allo-yohimban-18-one 16β-carboxylic acid.

Hydrolysis of the 16β-esterified carboxyl group may be carried out according to known methods; for example, the esterified carboxyl group may be cleaved by treatment with an alkali metal hydroxide, e.g. sodium hydroxide, potassium hydroxide and the like, in a lower alkanol, e.g. methanol, ethanol and the like, or, preferably, in an aqueous solution of a lower alkanol.

The 16β-carboxyl group in a resulting 3-epi-allo-yohimban-18-one 16β-carboxylic acid may be esterified according to known methods; for example, the starting material, preferably a solution thereof, may be treated with a lower diazo-alkane or with a substituted lower diazo-alkane. The diazo-reagent, which is preferably used in the form of a solution thereof in an inert solvent, may be added to the starting material or a solution thereof; suitable solvents are, for example, ethers, e.g. diethylether, tetrahydrofuran and the like, lower alkanols, e.g. methanol, ethanol and the like, halogenated hydrocarbons, e.g. chloroform, methylenechloride and the like, or any other appropriate solvents. An excess of the diazo-compound present after the completion of the reaction may be destroyed, for example, by adding an additional carboxylic acid, such as acetic, benzoic acid and the like.

The compounds of the present invention, as well as the starting materials and intermediates used in their formation, or derivatives thereof, may be present in the form of mixtures of racemates, single racemates or antipodes.

Mixtures of racemates of final products or starting materials may be separated into the single racemates on the basis of physico-chemical differences, for example, by fractionated crystallization and the like.

Racemates of intermediates and final products may be resolved into antipodes, for example, by treating a solution of the free racemic base in a suitable inert solvent with one of the optically active forms of an acid having an asymmetric carbon atom, or a solution thereof. Especially useful as opticallyy active forms of salt-forming acids having an asymmetric carbon atom are D- and L-tartaric acid, as well as the optically active forms of di-o-toluyl-tartaric, malic, mandelic, camphor-10-sulfonic, quinic acid and the like. A salt may then be isolated, which is formed by the optically active acid with one of the optically active forms of the base. From a resulting salt, the free and optically active compounds may be obtained according to known methods used for the conversion of a salt into a free compound, for example, as outlined hereinbefore; a resulting optically active base may be converted into a functional ketonic derivative or into an acid addition salt, an N-oxide or an acid addition salt of an N-oxide thereof according to the previously described procedure. The optically active forms may also be obtained by resolution with biochemical methods.

The invention also comprises any modification of the process wherein a compound obtainable as an intermediate at any stage of the process is used as starting material and the remaining step(s) of the process is (are) carried out. It also includes any new intermediates, which may be formed in one of the procedures outlined hereinbefore.

In the process of this invention such starting materials are preferably used which lead to final products mentioned in the beginning as preferred embodiments of the invention.

This is a continuation-in-part application of our application Serial No. 66,691, filed November 2, 1960, now abandoned.

The following examples illustrate the invention and are not to be construed as being limitations thereon. Temperatures are given in degrees centigrade.

*Example 1*

A mixture of 3.17 g. of methyl 18-O-(4-bromo- phenyl-sulfonyl)-reserpate, 0.6 g. of N,N,N-triethylamine and 15 ml. of dimethyl sulfoxide is heated at 100° over a period of three hours while stirring. The cooled solution is poured into 100 ml. of a cold, approximately four percent aqueous solution of sodium carbonate, the resulting precipitate is filtered off and the solid material is dissolved in methylene chloride. The organic solution is washed with dilute aqueous sodium carbonate and then with saturated aqueous sodium chloride solution, dried and evaporated. The residue is triturated with diethyl ether, the crystalline material is filtered off and washed with diethyl ether to yield 1.5 g. of methyl 18β-desoxy-18-oxo-reserpate of the formula:

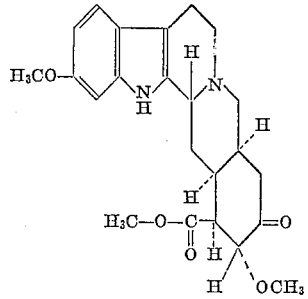

which melts at 240–241° (decomposition) after several recrystallizations from 95 percent ethanol; $[\alpha]_D^{26} = -17°$ (in chloroform).

The starting material used in the above reaction may be prepared as follows: To a solution of 10.0 g. of methyl reserpate in 70 ml. of pyridine is added 15.8 g. of 4-bromo-benzene sulfonyl chloride; the reaction mixture is allowed to stand at room temperature for 2½ days and is then poured into ice-water. The organic material is extracted with chloroform, the organic extract is washed with a 5 percent aqueous sodium hydroxide solution and subsequently with water until a neutral reaction is obtained. The organic solution is evaporated to dryness, and the resulting methyl 18-O-(4-bromo-phenyl-sulfonyl)-reserpate is recrystallized from acetone, M.P. 209–212°; yield: 5.64 g.

Selecting the appropriate starting materials, other 3-epi-allo-yohimban-18-one 16β-carboxylic acid esters, such as, for example, other lower alkyl 18β-desoxy-18-oxo-reserpates, e.g.

ethyl 18β-desoxy-18-oxo-reserpate,
n-propyl 18β-desoxy-18-oxo-reserpate,
isopropyl 18β-desoxy-18-oxo-reserpate,
n-butyl 18β-desoxy-18-oxo-reserpate,
isobutyl 18β-desoxy-18-oxo-reserpate,
n-pentyl 18β-desoxy-18-oxo-reserpate,
n-hexyl 18β-desoxy-18-oxoreserpate and the like,
lower alkyl 18β-desoxy-9-methoxy-18-oxo-deserpidates, e.g.
methyl 18β-desoxy-9-methoxy-18-oxo-deserpidate,
ethyl 18β-desoxy-9-methoxy-18-oxo-deserpidate,
n-propyl 18β-desoxy-9-methoxy-18-oxo-deserpidate and the like,
lower alkyl 18β-desoxy-10-methoxy-18-oxo-deserpidates, e.g.
methyl 8β-desoxy-10-methoxy-8-oxo-deserpidate,
ethyl 18β-desoxy-10-methoxy-18-oxo-deserpidate,
n-propyl 18β-desoxy-10-methoxy-18-oxo-deserpidate,
isopropyl 18β-desoxy-10-methoxy-18-oxo-deserpidate and the like,
lower alkyl 18β-desoxy-10-ethoxy-18-oxo-deserpidates, e.g.
methyl 18β-desoxy-10-ethoxy-18-oxo-deserpidate,
ethyl 18β-desoxy-10-ethoxy-18-oxo-deserpidate and the like,
lower alkyl 18β-desoxy-11-ethoxy-18-oxo-deserpidates, e.g.
methyl 18β-desoxy-11-ethoxy-18-oxo-deserpidate,
ethyl 18β-desoxy-11-ethoxy-18-oxo-deserpidate and the like,
lower alkyl 18β-desoxy-18-oxo-11-n-propyloxy-deserpidates, e.g.
methyl 18β-desoxy-18-oxo-11-n-propyloxy-deserpidate,
ethyl 18β-desoxy-18-oxo-11-n-propyloxy-deserpidate and the like,
lower alkyl 18β-desoxy-11-isopropyloxy-18-oxo-deserpidates, e.g.
methyl 18β-desoxy-11-isopropyloxy-18-oxo-deserpidate,
ethyl 18β-desoxy-11-isopropyloxy-18-oxo-deserpidate and the like,
lower alkyl 11-n-butyloxy-18β-desoxy-18-oxo-deserpidates, e.g.
methyl 11-n-butyl-oxo-18β-desoxy-18-oxo-deserpidate,
ethyl 11-n-butyloxy-18β-desoxy-18-oxo-deserpidate and the like,
lower alkyl 18β-desoxy-12-methoxy-18-oxo-deserpidates, e.g.
18β-desoxy-12-methoxy-18-oxo-deserpidate,
ethyl 18β-desoxy-12-methoxy-18-oxo-deserpidate and the like,
lower alkyl 18β-desoxy-18-oxo-deserpidates, e.g.
methyl 18β-desoxy-18-oxo-deserpidate,
ethyl 18β-desoxy-18-oxo-deserpidate,
n-propyl 18β-desoxy-18-oxo-deserpidate,
isopropyl 18β-desoxy-18-oxo-deserpidate,
n-butyl 18β-desoxy-18-oxo-deserpidate,
secondary butyl 18β-desoxy-18-oxo-deserpidate,
n-pentyl 18β-desoxy-18-oxo-deserpidate and the like,
lower alkyl 18β-desoxy-5-methyl-18-oxo-reserpates, e.g.
methyl 18β-desoxy-5-methyl-18-oxo-reserpate,
ethyl 18β-desoxy-5-methyl-18-oxo-reserpate,
n-propyl 18β-desoxy-5-methyl-18-oxo-reserpate and the like,
lower alkyl 18β-desoxy-6-methyl-18-oxo-reserpates, e.g.
methyl 18β-desoxy-6-methyl-18-oxo-reserpate,
ethyl 18β-desoxy-6-methyl-18-oxo-reserpate,
n-butyl 18β-desoxy-6-methyl-18-oxo-reserpate and the like,
lower alkyl 18β-desoxy-6-ethyl-18-oxo-reserpates, e.g.
methyl 18β-desoxy-6-ethyl-18-oxo-reserpate,
ethyl 18β-desoxy-6-ethyl-18-oxo-reserpate and the like,
lower alkyl 18β-desoxy-6-methyl-18-oxo-deserpidate, e.g.
methyl 18β-desoxy-6-methyl-18-oxo-deserpidate,
ethyl 18β-desoxy-6-methyl-18-oxo-desperpidate, n-propyl 18β-desoxy-6-methyl-18-oxo-desperpidate and the like,
lower alkyl 18β-desoxy-9-methyl-18-oxo-deserpidates, e.g.
methyl 18β-desoxy-9-methyl-18-oxo-deserpidate,
ethyl 18β-desoxy-9-methyl-18-oxo-deserpidate,
n-propyl 18β-desoxy-9-methyl-18-oxo-methyl-deserpidate and the like,
lower alkyl 18β-desoxy-10-methyl-18-oxo-deserpidates, e.g.
methyl 18β-desoxy-10-methyl-18-oxo-deserpidate,
ethyl 18β-desoxy-10-methyl-18-oxo-deserpidate and the like,
lower alkyl 18β-desoxy-11-methyl-18-oxo-deserpidates, e.g.
methyl 18β-desoxy-11-methyl-18-oxo-deserpidate,
ethyl 18β-desoxy-11-methyl-18-oxo-deserpidate,
n-propyl 18β-desoxy-11-methyl-18-oxo-deserpidate and the like,
lower alkyl 18β-desoxy-10-methoxy-18-oxo-reserpates, e.g.
methyl 18β-desoxy-10-methoxy-18-oxo-reserpate, e.g.
methyl 18β-desoxy-10-methoxy-18-oxo-reserpate,
n-propyl 18β-desoxy-10-methoxy-18-oxo-reserpate and the like,
lower alkyl 18β-desoxy-9,10-dimethoxy-18-oxo-reserpates, e.g.
methyl 18β-desoxy-9,10-dimethoxy-18-oxo-reserpate,
ethyl 18β-desoxy-9,10-dimethoxy-18-oxo-reserpate,
n-butyl 18β-desoxy-9,10-dimethoxy-18-oxo-reserpate and the like,
lower alkyl 18β-desoxy-10,11-methylenedioxy-18-oxo-deserpidates, e.g.
methyl 18β-desoxy-10,11-methylenedioxy-18-oxo-deserpidate,
ethyl-18β-desoxy-10,11-methylenedioxy-18-oxo-deserpidate and the like,
lower alkyl 10-benzyloxy-18β-desoxy-18-oxo-deserpidates, e.g.
methyl 10-benzyloxy-18β-desoxy-18-oxo-deserpidate,
ethyl 10-benzyloxy-18β-desoxy-18-oxo-deserpidate,
n-propyl 10-benzyloxy-18β-desoxy-18-oxo-deserpidate and the like,
lower alkyl 11-benzyloxy-18β-desoxy-18-oxo-deserpidates, e.g.
methyl 11-benzyloxy-18β-desoxy-18-oxo-deserpidate,
ethyl 11-benzyl-oxy-18β-desoxy-18-oxo-deserpidate,
isopropyl 11-benzyloxy-18β-desoxy-18-oxo-deserpidate and the like,
lower alkyl 18β-desoxy-11-N,N-dimethylamino-18-oxo-reserpates, e.g.
methyl 18β-desoxy-11-N,N-dimethylamino-18-oxo-reserpate,
ethyl 18β-desoxy-11-N,N-dimethylamino-18-oxo-reserpate and the like,
lower alkyl 18β-desoxy-10-methylmercapto-18-oxo-deserpidates, e.g.
methyl 10-methylmercapto-18β-desoxy-18-oxo-deserpidate,
ethyl 10-methylmercapto-18β-desoxy-18-oxo-deserpidate and the like,
lower alkyl 18β-desoxy-11-methylmercapto-18-oxo-deserpidates, e.g.
methyl 18β-desoxy-11-methylmercapto-18-oxo-deserpidate,
ethyl 18β-desoxy-11-methyl-mercapto-18-oxo-deserpidate,
n-propyl 18β-desoxy-11-methylmercapto-18-oxo-deserpidate and the like,
lower alkyl 18β-desoxy-11-ethyl-mercapto-18-oxo-deserpidates, e.g.
methyl 18β-desoxy-11-ethyl-mercapto-18-oxo-deserpidate,
ethyl 18β-desoxy-11-methylmercapto-18-oxo-deserpidate,
n-propyl 18β-desoxy-11-ethylmercapto-18-oxo-deserpidate and the like,
lower alkyl 18β-desoxy-11-fluoro-18-oxo-deserpidates, e.g.
methyl 18β-desoxy-11-fluoro-18-oxo-deserpidate,
ethyl 18β-desoxy-11-fluoro-18-oxo-deserpidate,
isopropyl 18β-desoxy-11-fluoro-18-oxo-deserpidate and the like,
lower alkyl 10-chloro-18β-desoxy-18-oxo-deserpidates, e.g.
methyl 10-chloro-18β-desoxy-18-oxo-deserpidate,
ethyl 10-chloro-18β-desoxy-18-oxo-deserpidate,
isobutyl 10-chloro-18β-desoxy-18-oxo-deserpidate and the like,
lower alkyl 18β-desoxy-9,12-dichloro-18-oxo-deserpidates, e.g.
methyl 18β-desoxy-9,12-dichloro-18-oxo-deserpidate,
n-propyl 18β-desoxy-9,12-dichloro-18-oxo-deserpidate and the like,
lower alkyl 18β-desoxy-11,12-dichloro-18-oxo-deserpidates, e.g.
methyl 18β-desoxy-11,12-dichloro-18-oxo-deserpidate,
ethyl 18β-desoxy-11,12-dichloro-18-oxo-deserpidate and the like,
lower alkyl 10-bromo-18β-desoxy-18-oxo-reserpates, e.g.
methyl 10-bromo-18β-desoxy-18-oxo-reserpate,
ethyl 10-bromo-18β-desoxy-18-oxo-reserpate,
n-propyl 10-bromo-18β-desoxy-18-oxo-reserpate and the like,
lower alkyl 17α-desmethoxy-18β-desoxy-17α-ethoxy-18-oxo-reserpates, e.g.
methyl 17α-desmethoxy-18β-desoxy-17α-ethoxy-18-oxo-reserpate,
ethyl 17α-desmethoxy-18β-desoxy-17α-ethoxy-18-oxo-reserpate and the like,
lower alkyl 17α-desmethoxy-18β-desoxy-18-oxo-17α-n-propyloxy-reserpates, e.g.
methyl 17α-desmethoxy-18β-desoxy-18-oxo-17α-n-propyloxy-reserpate,
ethyl 17α-desmethoxy-18β-desoxy-18-oxo-17α-n-propyloxy-reserpate and the like,
lower alkyl 17α-desmethoxy-18β-desoxy-17α-isopropyloxy-18-oxo-reserpates, e.g.
methyl 17α-desmethoxy-18β-desoxy-17α-isopropyloxy-18-oxo-reserpate,
ethyl 17α-desmethoxy-18β-desoxy-17α-isopropyloxy-18-oxo-reserpate and the like,
lower alkyl 17α-desmethoxy-18β-desoxy-18-oxo-deserpidates, e.g.
methyl 17α-desmethoxy-18β-desoxy-17α-ethoxy-18-oxo-deserpidate,
ethyl 17α-desmethoxy-18β-desoxy-17α-ethoxy-18-oxo-deserpidate,
n-propyl 17α-desmethoxy-18β-desoxy-17α-ethoxy-18-oxo-deserpidate and the like,
lower alkyl 17α-cyano-17α-desmethoxy-18β-desoxy-18-oxo-reserpates, e.g.
methyl 17α-cyano-17α-desmethoxy-18β-desoxy-18-oxo-reserpate,
ethyl 17α-cyano-17α-desmethoxy-18β-desoxy-18-oxo-reserpate and the like,
lower alkyl 17α-cyano-17α-desmethoxy-18β-desoxy-18-oxo-deserpidates, e.g.
methyl 17α-cyano-17α-desmethoxy-18β-desoxy-18-oxo-deserpidate and the like,
lower alkoxy-lower alkyl 18β-desoxy-18-oxo-reserpates,
2-methoxyethyl 18β-desoxy-18-oxo-reserpate,
2-ethoxyethyl 18β-desoxy-18-oxo-reserpate,
2-methoxypropyl 18β-desoxy-18-oxo-reserpate,
3-methoxypropyl 18β-desoxy-18-oxo-reserpate,
3-methoxypropyl 18β-desoxy-18-oxo-reserpate and the like,
lower alkoxy-lower alkyl 18β-desoxy-18-oxo-deserpidates, e.g.
2-methoxyethyl 18β-desoxy-18-oxo-deserpidate,
2-ethoxyethyl 18β-desoxy-18-oxo-deserpidate,
3-methoxypropyl 18β-desoxy-18-oxo-deserpidate and the like,
N,N-di-lower alkyl-amino-lower alkyl 18β-desoxy-18-oxo-reserpates, e.g.
2-N,N-dimethylaminoethyl 18β-desoxy-18-oxo-reserpate,
2-N,N-diethylaminoethyl 18β-desoxy-18-oxo-reserpate, 3-N,N-dimethylaminopropyl 18β-desoxy-18-oxo-reserpate and the like,
N,N-di-lower alkyl-amino-lower alkyl-18-oxo-deserpidates, e.g.
2-N,N-dimethylaminoethyl 18β-desoxy-18-oxo-deserpidate,
2-N,N-diethylaminoethyl 18β-desoxy-18-oxo-deserpidate,
2-N,N-dimethylaminopropyl 18β-desoxy-18-oxo-deserpidate and the like, are prepared according to the above-described procedure.

*Example 2*

To a solution of methyl 18β-desoxy-18-oxo-reserpate in acetone is added a solution of an equivalent amount of concentrated hydrochloric acid. On scratching, the desired methyl 18β-desoxy-18-oxo-reserpate hydrochloride crystallizes as the monohydrate, M.P. 229–233° (with decomposition).

*Example 3*

To a warm solution of 0.41 g. of methyl 18β-desoxy-18-oxo-reserpate in about 10–15 ml. of acetone is added a solution of 0.12 g. of maleic acid in acetone; the desired methyl 18β-desoxy-18-oxo-reserpate maleate hemihydrate melts at 189–191° (with decomposition).

*Example 4*

A mixture of 2.06 g. of methyl 18β-desoxy-18-oxo-reserpate, 2.0 g. of hydroxylamine hydrochloride, 50 ml. of anhydrous pyridine and 50 ml. of absolute ethanol is refluxed for 3½ hours. The solvent is evaporated under reduced pressure, the residue is dissolved in water, the solution is made alkaline with aqueous ammonia, and the supernatant solution is decanted from the gummy material. Water is added, and the mixture is stirred and separated by filtration. The granular material is washed with water and recrystallized from about 20 ml. of methanol by adding methylene chloride to the boiling slurry and then evaporating the methylene chloride. The analytically pure methyl 18β-desoxy-18-oximino-reserpate of the formula:

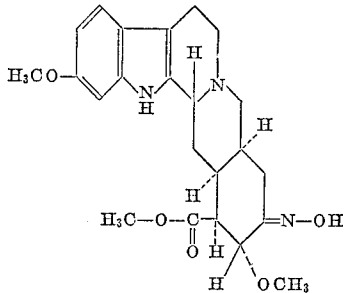

melts at 236–237°.

Other 18-oximino-3-epi-allo-yohimbane 16β-carboxylic acid esters, such as other lower alkyl 18β-desoxy-18-oximino-reserpates, e.g.

ethyl 18β-desoxy-18-oximino-reserpate,
n-propyl 18β-desoxy-18-oximino-reserpate,
isopropyl 18β-desoxy-18-oximino-reserpate,
n-butyl 18β-desoxy-18-oximino-resperate,
isobutyl 18β-desoxy-18-oximino-reserpate,
n-pentyl 18β-desoxy-18-oximino-reserpate,
n-hexyl 18β-desoxy-18-oximino-reserpate and the like,
lower alkyl 18β-desoxy-9-methoxy-18-oximino-deserpidates, e.g.
methyl 18β-desoxy-9-methoxy-18-oximino-deserpidate,
ethyl 18β-desoxy-10-methoxy-18-oximino-deserpidate,
n-propyl 18β-desoxy-9-methoxy-18-oximino-desperpidate and the like,
lower alkyl 18β-desoxy-10-methoxy-18-oximino-deserpidates, e.g.
methyl 18β-desoxy-10-methoxy-18-oximino-deserpidate,
ethyl 18β-desoxy-10-methoxy-18-oximinio-deserpidate,
n-propyl 18β-desoxy-10-methoxy-18-oximino-deserpidate,
isopropyl 18β-desoxy-10-methoxy-18-oximino-deserpidate and the like,
lower alkyl 18β-desoxy-10-ethoxy-18-oximino-deserpidates, e.g.
methyl 18β-desoxy-10-ethoxy-18-oximino-deserpidate,
ethyl 18β-desoxy-10-ethoxy-18-oximino-deserpidate and the like,
lower alkyl 18β-desoxy-11-ethoxy-18-oximino-deserpidates, e.g.
methy 18β-desoxy-11-ethoxy-18-oximino-deserpidate,
ethyl 18β-desoxy-11-ethoxy-18-oximino-deserpidate and the like,
lower alkyl 18β-desoxy-18-oximino-11-n-propyloxy-deserpidates, e.g.
methyl 18β-desoxy-18-oximino-11-n-propyloxy-deserpidate,
ethyl 18β-desoxy 18-oximino-11-n-propyloxy-18-oxo-deserpidate and the like,
lower alkyl 18β-desoxy-11-isoproplyoxy-18-oximino-deserpidates, e.g.
methyl 18β-desoxy-11-isopropyloxy-18-oximino-deserpidate,
ethyl 18β-desoxy-11-isopropyloxy-18-oximino-deserpidate and the like,
lower alkyl 11-n-butyloxy-18β-desoxy-18-oximino-deserpidates, e.g.
methyl 11-n-butyloxy-18β-desoxy-18-oximino-deserpidate,
ethyl 11-n-butyloxy-18β-desoxy-18-oximino-deserpidate and the like,
lower alkyl 18β-desoxy-12-methoxy-18-oximino-deserpidates, e.g.
18β-desoxy-12-methoxy-18-oximino-deserpidate,
ethyl 18β-desoxy-12-methoxy-18-oximino-deserpidate and the like,
lower alkyl 18β-desoxy-18-oximino-deserpidates, e.g.
methyl 18β-desoxy-18-oximino-deserpidate,
ethyl 18β-desoxy-18-oximino-desperidate,
n-propyl 18β-desoxy-18-oximino-deserpidate,
isopropyl 18β-desoxy-18-oximino-deserpidate,
n-butyl 18β-desoxy-18-oximino-deserpidate,
isobutyl 18β-desoxy-18-oximino-deserpidate,
secondary butyl 18α-desoxy-18-oximino-deserpidate,
n-pentyl 18β-desoxy-18-oximino-deserpidate and the like,
or other esters of 18β-desoxy-18-oximino-deserpidic acids, such as, for example, lower alkyl 5-methyl-18β-desoxy-18-oximino-reserpates,
lower alkyl 18β-disoxy-6-methyl-18-oximino-reserpates,
lower alkyl 18β-desoxy-18-oximino-reserpates,
lower alkyl 18β-desoxy-6-methyl-18-oximino-deserpidates,
lower alkyl 18β-desoxy-9-methyl-18-oximino-desperpidates,
lower alkyl 18β-desoxy-10-methyl-18-oximino-deserpidates,
lower alkyl 18β-desoxy-11-methyl-18-oximino-deserpidates,
lower alkyl 18β-desoxy-10-methoxy-18-oximino-reserpates,
lower alkyl 18β-desoxy-9,10-dimethoxy-18-oximino-reserpates,
lower alkyl 18β-desoxy-10,11-methylenedioxy-18-oximino-deserpidates,
lower alkyl 10-benzyloxy-18β-desoxy-18-oximino-deserpidates,
lower alkyl 11-benzyloxy-18β-desoxy-18-oximino-deserpidates,
lower alkyl 18β-desoxy10-methylmercapto-18-oximino-deserpidates,
lower alkyl 18β-desoxy-11-methylmercapto-18-oximino-deserpidates,
lower alkyl 18β-desoxy-11-ethylmercapto-18-oximino-deserpidates,
lower alkyl 18β-desoxy-11-fluoro-18-oximino-deserpidates,
lower alkyl 10-chloro-18β-desoxy-18-oximino-deserpidates, lower alkyl 18β-desoxy-9,12-dichloro-18-oximino-
   deserpidates,
lower alkyl 18β-desoxy-11,12-dichloro-18-oximino-
   deserpidates,
lower alkyl 18β-desoxy-10-bromo-18-oximino-reserpates,
lower alkyl 18β-desoxy-11-N,N-dimethylamino-18-
   oximino-deserpidates,
lower alkyl 17α-desmethoxy-18β-desoxy-17α-ethoxy-18-
   oximino-reserpates,
lower alkyl 17α-desmethoxy-18β-desoxy-18-oximino-17α-
   n-propyloxy-reserpates,
lower alkyl 17α-desmethoxy-18β-desoxy-17α-isopropyl-
   oxy-18-oximino-reserpates,
lower alkyl 17α-desmethoxy-18β-desoxy-17α-ethoxy-18-
   oximino-deserpidates,
lower alkyl 17α-cyano-17α-desmethoxy-18β-desoxy-18-
   oximino-reserpates,
lower alkyl 17α-cyano-17α-desmethoxy-18β-desoxy-18-
   oximino-deserpidates,
lower alkoxy-lower alkyl 18β-desoxy-18-oximino-
   reserpates,
lower alkoxy-lower alkyl 18β-desoxy-18-oximino-
   deserpidates,
N,N-di-lower alkyl-amino-lower alkyl 18β-desoxy-18-
   oximino-reserpates,
N,N-di-lower alkyl-amino-lower alkyl 18-oximino-
   deserpidates and the like, may be prepared according to the previously described
procedure, using the previously described 3-epi-allo-yohim-
ban-18-one 16β-carboxylic acid esters as starting ma-
terials.

*Example 5*

To a suspension of 0.43 g. of methyl 18β-desoxy-18-
oximino-reserpate in 5 ml. of methanol is added a solu-
tion of 0.1 ml. of concentrated hydrochloric acid in 1 ml.
of methanol. Complete solution occurs on stirring, and
on scratching, crystallization sets in. The solid material
is filtered off, washed with cold methanol and recrystal-
lized from methanol to yield the methyl 18β-desoxy-18-
oximino-reserpate hydrochloride monohydrate, M.P. 239°
(with decomposition).

*Example 6*

A mixture of 2.06 g. of methyl 18β-desoxy-18-oxo reser-
pate, 2.0 g. of semicarbazide hydrochloride, 50 ml. of
pyridine and 100 ml. of absolute ethanol is refluxed
gently for two hours. The yellow solution is evaporated
to dryness under reduced pressure; the residue is dissolved
in water and the solution is made alkaline with am-
monium hydroxide. A gum precipitate which solidifies
upon repeated trituration with several batches of water.
The dried material is then triturated with methylene chlo-
ride, and the desired methyl 18β-desoxy-18-oxo-reserpate
semicarbazone of the formula:

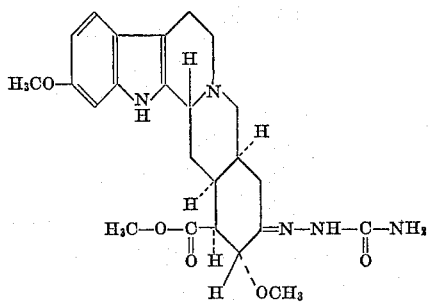

is recrystallized from methanol, M.P. 196–201°;
$[\alpha]_D^{22} = +58.5°$ (in chloroform).

To a solution of 0.61 g. of methyl 18β-desoxy-18-oxo-
reserpate semicarbazone in 30 ml. of acetone is added a
solution of 0.13 ml. of concentrated hydrochloric acid
in 1.5 ml. of acetone. The reaction mixture is chilled,
the resulting precipitate is filtered off and washed with
acetone. The methyl 18β-desoxy-18-oxo-reserpate semi-
carbazone hydrochloride sesquihydrate, after drying at
room temperature over phosphorus pentoxide, starts to
decompose at about 245°.

*Example 7*

A mixture of 0.41 g. of methyl 18β-desoxy-18-oxo-
reserpate, 0.6 ml. of ethylene glycol and 0.2 g. of p-
toluene sulfonic acid in 100 ml. of dry ethylene dichloride
is refluxed in a Soxhlet apparatus in such manner that the
condensate passes through the thimble containing anhy-
drous calcium sulfate; the reaction, which is maintained
for six hours, is carried out in a nitrogen atmosphere.
The solution is then washed twice with a 5 percent
aqueous solution of sodium carbonate, twice with water
and once with a saturated aqueous sodium chloride solu-
tion, dried over sodium sulfate and then evaporated to
dryness. The residue is triturated with diethyl ether to
yield the crystalline methyl 18β-desoxy-18-ethylenedioxy
reserpate of the formula:

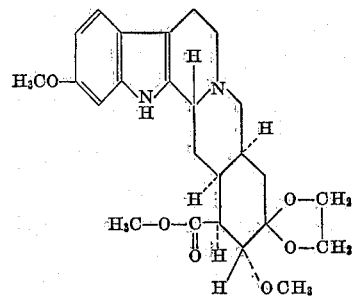

which is recrystallized from a mixture of benzene and
cyclohexane, M.P. 205–206°; $[\alpha]_D^{24} = -56°$ (in chloro-
form).

*Example 8*

To a suspension of 0.82 g. of methyl 18β-desoxy-18-
oxo-reserpate in 35 ml. of methanol is added 0.8 g. of
sodium borohydride. The mixture is allowed to stand
for one-half hour, during which time the initially vigorous
reaction subsides. The solvent is then evaporated under
reduced pressure, ice-water is added to the residue and
the resulting solid is filtered off, is washed with water
and dried. Two recrystallizations from acetonitrile yield
0.43 g. of methyl 18-epi-reserpate monohydrate, which
melts at 221–223° (decomposition). The crystalline ma-
terial resulting by twice recrystallizing the residue of the
mother liquors obtained after the first of the two above
recrystallizations from acetonitrile yields methyl reserpate,
M.P. 242–244°.

The above methyl 18-epi-reserpate, when treated with
an organic sulfonic acid halide, such as, for example, 4-
bromo-benzene sulfonyl chloride, 3-nitro-benzene sulfonyl
chloride and the like, preferably in the presence of pyri-
dine, yields a methyl 18-epi-O-(organic sulfonyl)-reser-
pate, e.g. the methyl 18-epi-O-(4-bromo-phenyl-sulfonyl)-
reserpate (M.P. 210–212°), methyl 18-epi-O-(3-nitro-
phenyl-sulfonyl)-reserpate (M.P. 174–176°) and the like,
which upon treatment with a lower alkanol, e.g. methanol,
ethanol, n-propanol and the like, if necessary, in the
presence of a base, e.g. N,N,N-triethylamine, pyridine and
the like, yields a methyl 18-O-lower alkyl-reserpate, e.g.
methyl 18-O-methyl-reserpate (M.P. 235–237°), methyl
18-O-ethyl-reserpate (M.P. 221–222.5°) and the like.
The latter compounds have strong sedative and tranquiliz-
ing effects.

What is claimed is:

1. A member selected from the group consisting of a compound of the formula:

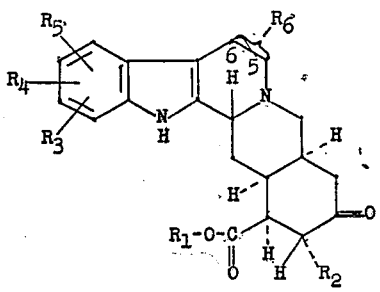

in which $R_1$ is a member selected from the group consisting of lower alkyl, phenyl-lower alkyl, lower alkoxy-lower alkyl, in which lower alkyl separates lower alkoxy from the carboxyl group by two to four carbon atoms, and N,N-di-lower alkyl-amino-lower alkyl, in which lower alkyl separates N,N-di-lower alkyl-amino from the carboxyl group by two to four carbon atoms, $R_2$ stands for a member selected from the group consisting of lower alkoxy and cyano, each of the groups $R_3$, $R_4$ and $R_5$ is a member selected from the group consisting of hydrogen, lower alkyl, lower alkoxy, phenyl-lower alkoxy, halogeno, lower alkyl-mercapto, and, whenever two of the groups $R_3$, $R_4$ and $R_5$ are attached to two adjacent positions and taken together, lower alkylenedioxy, and $R_6$ is a member selected from the group consisting of hydrogen and lower alkyl, an oxime of such compound, a semicarbazone of such compound and a lower alkylene glycol ketal of such compound, and a non-toxic acid addition salt thereof, an N-oxide thereof and a non-toxic acid addition salt of an N-oxide thereof.

2. A member selected from the group consisting of a compound of the formula:

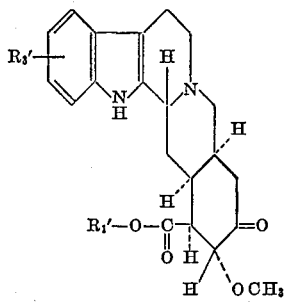

in which $R_1'$ stands for lower alkyl, and $R_3'$ stands for lower alkoxy, and a non-toxic acid addition salt of such compound.

3. Lower alkyl 18β-desoxy-18-oxo-reserpate.
4. A non-toxic acid addition salt of lower alkyl 18β-desoxy-18-oxo-reserpate.
5. Methyl 18β-desoxy-18-oxo-reserpate.
6. Methyl 18β-desoxy-18-oxo-reserpate hydrochloride.
7. Methyl 18β-desoxy-18-oxo-reserpate maleate.
8. A member selected from the group consisting of compounds of the formula:

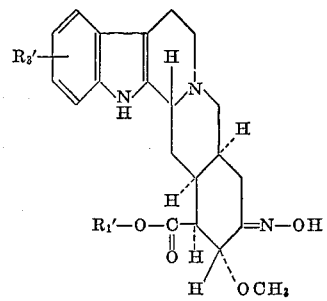

in which $R_1'$ is lower alkyl and $R_3'$ is lower alkoxy, and a non-toxic acid addition salt thereof.

9. Lower alkyl 18β-desoxy-18-oximino-reserpate.
10. A non-toxic acid addition salt of lower alkyl 18β-desoxy-18-oximino-reserpate.
11. Methyl 18β-desoxy-18-oximino-reserpate.
12. Methyl 18β - desoxy - 18 - oximino - reserpate hydrochloride.

References Cited in the file of this patent

Kornblum et al.: Jour. Amer. Chem. Soc., vol. 79 (1957), page 6562.
Kornblum et al.: Jour. Amer. Chem. Soc., vol. 81 (1959), pages 4113 and 4114.
Hunsberger et al.: Chemistry and Industry (1959), page 88.